United States Patent
Kim et al.

(10) Patent No.: US 6,735,588 B2
(45) Date of Patent: May 11, 2004

(54) INFORMATION SEARCH METHOD AND APPARATUS USING INVERSE HIDDEN MARKOV MODEL

(75) Inventors: Bo-Sung Kim, Suwon (KR); Jun-dong Cho, Gwacheon (KR); Young-hoon Chang, Suwon (KR); Sun-hee Park, Yongin (KR)

(73) Assignees: Samsung Electronics Co., Ltd., Suwon (KR); Sungkyunkwan University, Seoul (KR)

( * ) Notice: Subject to any disclaimer, the term of this patent is extended or adjusted under 35 U.S.C. 154(b) by 410 days.

(21) Appl. No.: 09/853,649

(22) Filed: May 14, 2001

(65) Prior Publication Data

US 2002/0065959 A1 May 30, 2002

(30) Foreign Application Priority Data

Oct. 13, 2000 (KR) ........................................ 2000-60262

(51) Int. Cl.[7] .............................................. G06F 17/30
(52) U.S. Cl. ............................................ 707/5; 704/256
(58) Field of Search ............................... 707/5, 103, 3; 704/9, 256

(56) References Cited

U.S. PATENT DOCUMENTS

| | | | | |
|---|---|---|---|---|
| 5,515,475 A | * | 5/1996 | Gupta et al. | 704/242 |
| 5,524,240 A | * | 6/1996 | Barbara et al. | 707/3 |
| 5,706,397 A | * | 1/1998 | Chow | 704/243 |
| 5,970,453 A | * | 10/1999 | Sharman | 704/260 |
| 5,991,720 A | * | 11/1999 | Galler et al. | 704/256 |
| 6,311,182 B1 | * | 10/2001 | Colbath et al. | 707/6 |

OTHER PUBLICATIONS

Song, Enhancement of Discriminative Capabilities of HMM Based Recognizer through Modification of Viterbi Algorithm, IEEE, 1995 International Conference on Acoustic, Speech, and Signal Processing, vol. 1 pp. 469–472.*

Laface et al., A Fast Segmental Viterbi Algorithm for Large Vocabulary Recognition, IEEE, 1995 International Conference on Accoustics, Speech, and Signal Processing, vol. 1 pp. 560–563.*

Yun–Seok Cho and Hwang–Soo Lee "*A Real–Time Isolated Word Recognition System*," Intelligent Signal Processing and Communications Systems (ISPACS), 1994, pp. 230–235.

CAD and VLSI Design research Group–Collection of Academic Theses, entitled "Fast and Low Power Viterbi Search Engine using Inverse Hidden Markov Mode", by Bo–sung Kim et al., publication date May 13, 2000.

\* cited by examiner

*Primary Examiner*—Greta Robinson
(74) *Attorney, Agent, or Firm*—Burns, Doane, Swecker & Mathis, L.L.P.

(57) ABSTRACT

An information search method and apparatus employ an Inverse Hidden Markov Model (IHMM) for stochastically searching for a reference information model among a plurality of predetermined reference information models obtained by training that best matches unknown information which is expressed by a Hidden Markov Model (HMM) chain. The method and apparatus find an optimal path in a HMM state lattice using a minimum unlikelihood score, rather than a maximum likelihood score, and using a Viterbi algorithm, to recognize unknown information, so that unnecessary computations are avoided. The method and apparatus can be used for finding the most likely path through a vocabulary network for a given utterance.

12 Claims, 7 Drawing Sheets

1. Max = 0
2. for all_reference_sequence = 1 to M
3.   for t=1 to T
4.     for i=1 to N
5.       $\Phi_i(t) = 0$
6.       for j=1 to N
7.         $\Phi_i(t) = \max_t [\Phi_{ij}(t-1) + \log a_{ij} + \log b_{ij}(w(t))]$
8.       endfor
9.     endfor
10.   endfor
11.   if Max < $\Phi$all_reference_sequence then Max=$\Phi$all_reference_sequence
12. endfor

INFORMATION SEARCH METHOD AND APPARATUS USING INVERSE HIDDEN MARKOV MODEL

Priority is claimed to Korean Patent Application No. 00-60262 filed on Oct. 13, 2000, herein incorporated by reference.

BACKGROUND OF THE INVENTION

1. Field of the Invention

The present invention relates to a method and apparatus for recognizing unknown information using the Hidden Markov Model (HMM), and more particularly, to an information search method and apparatus using an Inverse Hidden Markov Model (IHMM) and the Viterbi algorithm, which can be used for finding the most likely path through the vocabulary network for a given utterance.

2. Description of the Related Art

Various information recognition methods are used for recognizing various types of information. In case that the information is in the form of speech, a speech recognition method is used for recognizing the information of speech. This will now be explained.

Speech recognition technology refers to technology for developing and implementing methods for enabling a machine or a computer to recognize human speech. To implement an interface which enables natural and smooth communications between a machine and a human being through speech, speech signal processing technology, particularly speech recognition technology, is necessary. Thanks to innovative developments in the fields of computer and signal processing technology, studies on speech recognition technology are making rapid progress. Also, the introduction of stochastic techniques, use of affluent speech data, combination of speech and language knowledge, and use of high-speed search algorithms have boosted this research.

In addition, due to the development of the semiconductor industry, very small-sized systems, which can be used for a long time with low power, have become commercially available. In communications fields, particularly the field of wireless communications, power consumption and device sizes can be reduced with hardware, i.e., by using a dedicated chip which performs speech recognition.

Because of their robust modeling capability and high recognition accuracy for speech signals, HMM-based speech recognition methods are extensively used in the speech recognition field. Speech recognition methods involve computing acoustic probabilities, and finding a best matching word using the acoustic probabilities. In particular, isolated word recognition using the HMM consists of two phases: a training phase and a search (recognition) phase. In the training phase, for each word in a predetermined dictionary to be used, the HMM parameters are estimated, and a distinct HMM is built up for each word using a training set of observations. In the search phase, the probability that a given utterance is similar to each word model of the dictionary is computed, and the highest likelihood word model is selected as the recognized word. The Viterbi algorithm is an efficient search technique for finding a best matching word by comparing an input utterance with each of the word models, i.e., reference speech models, in the dictionary, and thus is generally used in the search phase.

A typical speech recognition method is divided into a pre-process step, a core recognition step, and a post-process step. Detailed techniques applied to each of the steps will be described using an example. For the pre-process step, feature parameters which form reference utterances are estimated from an input speech signal. One of the methods to accomplish the pre-process step consists of linear predictive coding (LPC) and a filter bank front-end process.

The core recognition step involves matching and training processes. The estimated parameters express utterance features to match an input speech signal on a phonetic notation and word level. The utterance features of the input speech signal are expressed with the matching and training data set. The post-process step, as a search process, finds a best matching utterance sequence through the vocabulary network for a given utterance.

FIG. 1 is an exemplary state lattice of a conventional method illustrating a path along which an input speech utterance is recognized using a HMM. The state lattice includes a plurality of states 1 through 24 which are searched in order from state 1 to state 24.

For example, if a word "abbat" is uttered, the state lattice for the word is expressed, as shown in FIG. 1, by the general HMM. The HMM applied for speech recognition has local transition paths. Transition to a next state is determined by a previously accumulated state probability ($S_{t-1}(i)$), a transition probability ($a_{ij}$), and a next state observation probability ($b_{ij}(W(t))$), where t is a time variable, i is a variable denoting a state searched at time t in the lateral direction of the state lattice of FIG. 1, and j is a variable denoting a state searched at time t−1 in the lateral direction of the state lattice of FIG. 1. The next state observation probability is determined by a probability density function ($P(y|s^{(i)},\phi)$). State transition to a next state is performed by a conventional speech information search method that uses a Viterbi algorithm based on the maximum likelihood.

A conventional speech information search method will be described with reference to FIG. 2. FIG. 2 shows a pseudo code for illustrating the conventional speech information search method consisting of steps 1 through 12. Referring to FIG. 2, in step 1, a variable Max which indicates the maximum likelihood score is initialized to 0. In step 2, a variable all_reference_sequence, which indicates the location of each of the reference speech models stored in a dictionary, is set to 1. The variable t is set to 1 in step 3, and i is set to 1 in step 4. In step 5, the maximum state probability ($\phi_i(t)$) for the i-th state at time t is initialized to 0. In step 6, j is set to 1.

After all the variables are initialized, the maximum state probability ($\phi_i(t)$) for the i-th state at time t is computed in consideration of the accumulated state probability for the j-th state searched at time t−1(steps 6 through 8). In step 8, "endfor" means that the process goes back to step 6 if j≠N, and goes to step 9 if j=N. Steps 5 through 8 are iterated for all the states from 1 to N, so that N maximum state probabilities are obtained (steps 4 through 9). The maximum state probabilities are computed for a period of time T to find an optimal path for a particular reference speech model, so that the similarity between the given reference speech model and an input unknown speech signal is obtained (steps 3 through 10). Steps 3 through 10 are iterated for all the reference speech models (steps 2 through 12) stored in the dictionary. In step 11, $\phi_{all\_reference\_sequence}$, which means the optimal path value computed for a particular reference speech model, is compared with the maximum likelihood score (Max), and the maximum likelihood score (Max) is updated with the greater of the two. With the updated maximum likelihood score (Max), steps 2 through 12 are iterated for another reference speech model.

The conventional speech information search method illustrated in FIG. 2 needs probability computations for all states to obtain the maximum likelihood score. Due to the need for much computation, the conventional speech information search method is unsuitable for high-speed searching. For the conventional speech information search method, all the states are searched, and all the paths for each state must be stored, so that many hardware resources are consumed and many computations are inefficiently required. For these reasons, the conventional speech information search method has problems of increasing power consumption and computation time.

SUMMARY OF THE INVENTION

To solve the above problems, it is a first object of the present invention to provide an information search method using an Inverse Hidden Markov Model (IHMM), which finds an optimal path in a Hidden Markov Model (HMM) state lattice using a minimum unlikelihood score, rather than the maximum likelihood score, and using the Viterbi algorithm, to recognize unknown information, so that unnecessary computations are avoided.

It is a second object of the present invention to provide an information search apparatus using the IHMM used for the information search method described above.

To achieve the first object of the present invention, there is provided an information search method using an IHMM, for stochastically searching for a reference information model among a plurality of predetermined reference information models obtained by training that best matches unknown information which can be expressed by a HMM chain, the information search method comprising the steps of: (a) obtaining a minimum state probability $\phi'_i(t)$ for a particular state searched at a current time t in a HMM state lattice of a reference information model by using minimum state probabilities of effective states, each of which is a probability accumulated along a search path up to a previous time t−1, and then updating the obtained minimum state probability $\phi'_i(t)$ with a predetermined value if the minimum state probability $\phi'_i(t)$ is greater than a minimum unlikelihood score; (b) obtaining an optimal path value corresponding to the lowest of a plurality of minimum state probabilities obtained after step (a) is performed for a period of time T which is greater than t, and updating the minimum unlikelihood score with the optimal path value if the minimum unlikelihood score is greater than the optimal path value; (c) determining whether or not the optimal path value has been obtained for each of the predetermined reference information models, and if not, iterating steps (a) and (b) for another reference information model for which the optimal path value has not been obtained; and (d) if the optimal path value has been obtained for each of the reference information models, determining that the reference information model yielding the optimal path value with which the minimum unlikelihood score was last updated best matches the unknown information, wherein for the period of time T, step (a) is performed for each of one or more states searched at every current time t=1, 2, . . . T, the effective states are states searched at previous time t−1 which have minimum state probabilities less than the minimum unlikelihood score, and from which a transition can be made to the particular state searched at time t, and the minimum state probability of the particular state corresponds to the lowest among state probabilities of the particular state for making a transition to the particular state from the effective states.

It is preferable that the minimum state probability of the particular state corresponds to the lowest probability among the state probabilities obtained, equal in number to the effective states, by using the minimum state probabilities of the effective states, transition probabilities from the effective states to the particular state, and observation probabilities of the particular state, and the predetermined value is greater than the minimum unlikelihood score.

To achieve the second object of the present invention, there is provided an information search apparatus using an Inverse Hidden Markov Model (IHMM), for performing the information search method of any one of claims 1 through 4, the information search apparatus comprising: a storage unit for storing the minimum unlikelihood score, a first value related to the transition probability, and a second value related to the state observation probability; first through N-th processing units; first through N-th comparing & selecting units; a control unit for outputting a control signal in response to a comparison flag output from each of the first through the N-th comparing & selecting units, controlling reading of data stored in the storage unit, and passing values output from the first through the N-th comparing & selecting units; and a buffer for receiving and buffering values passed by the control unit and outputting each of the buffered values to a corresponding processing unit among the first through the N-the processing units, in response to the control signal, wherein an i-th processing unit processes a value output from the buffer, and the first value and the second value provided from the storage unit, compares the processed results, selects and outputs the smallest processed result in response to the control signal, and an i-th comparing & selecting unit compares the smallest processed result output from the i-th processing unit with the minimum unlikelihood score provided from the storage unit, selects one of the predetermined value and the smallest processed result in response to the result of the comparison, and outputs the selected value and a comparison flag having a level corresponding to the result of the comparison to the control unit.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 3:
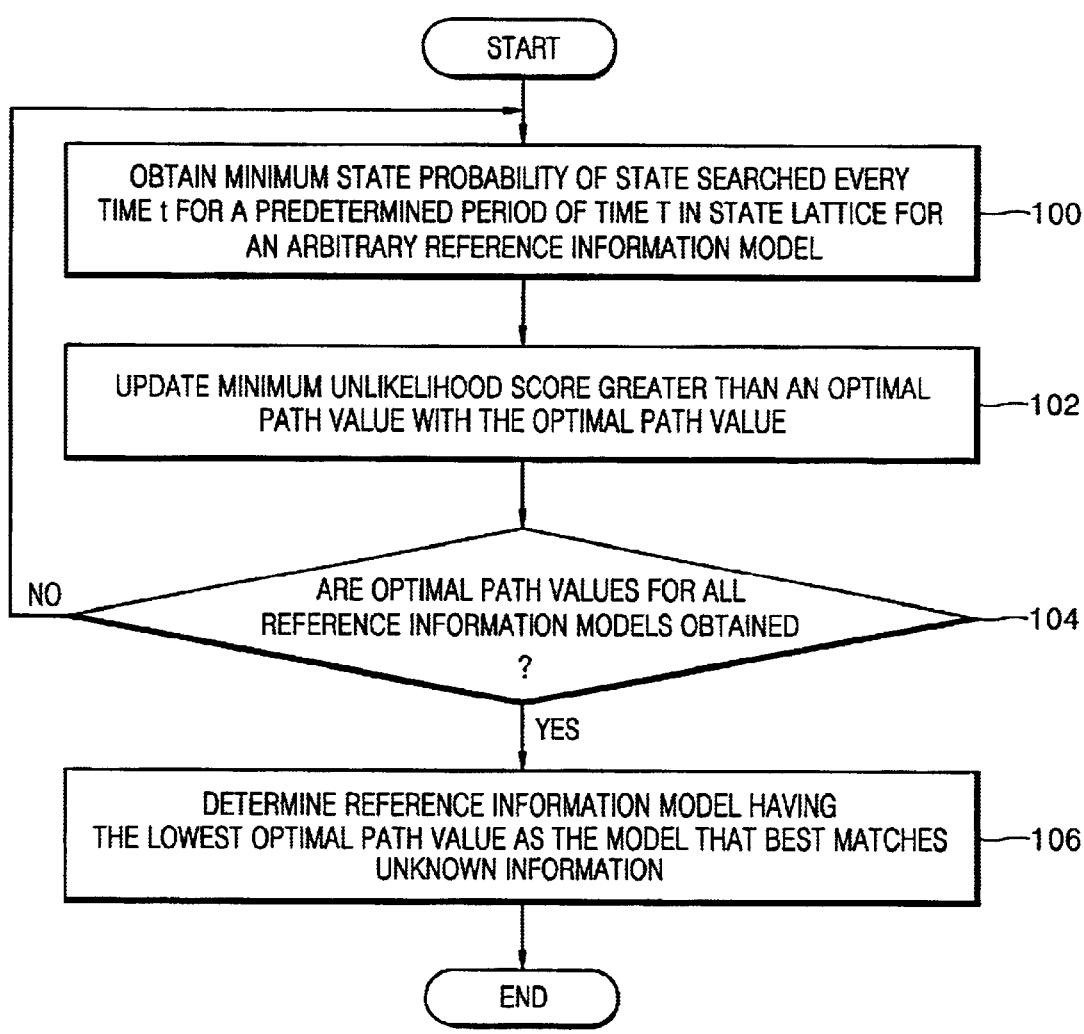
FIG. 3 is a flowchart illustrating an information search method using an Inverse Hidden Markov Model (IHMM) according to the present invention.

An information search method using an Inverse Hidden Markov Model (IHMM) according to the present invention is illustrated in FIG. 3. As shown in FIG. 3, the information search method involves obtaining the smallest optimal path value among the optical path values of all reference information models (steps 100 through 104); and identifying an input unknown information as the reference information model having the smallest optimal path value (step 106).

Figure 4:
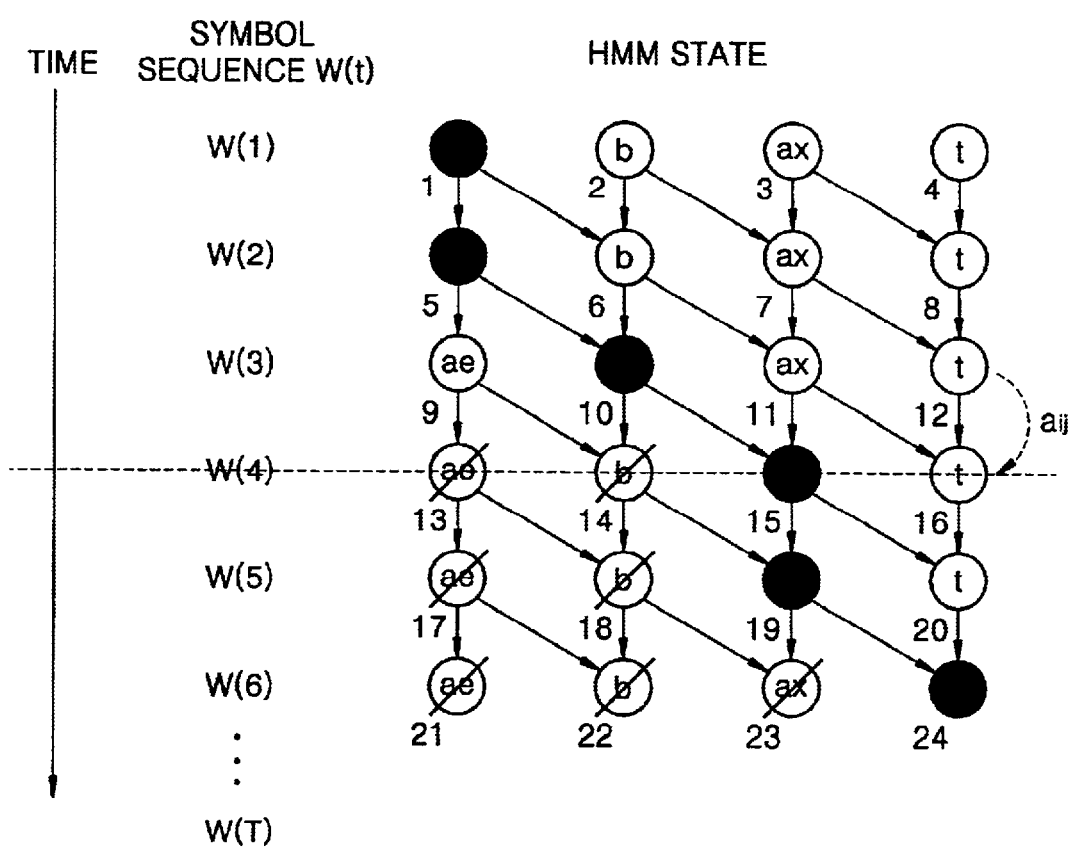
FIG. 4 is an exemplary state lattice for an arbitrary reference information model illustrating the low-power and high-speed information search method according to the present invention.

FIG. 4 is an exemplary state lattice for an arbitrary information model for illustrating the low-power and high-speed information search method according to the present invention. The state lattice consists of state 1 through state 24. The states are searched in order from state 1 to state 24. In FIG. 4, W(t) as a symbol sequence represents an utterance at time t. The number of next states at next time t+1 to which a transition can be made from a state at current time t is shown as two in FIG. 4. However, transitions can be made from a state at current time t to any one of the next states at next time t+1. Also, an optimal path is selected from all the possible paths, which will be described later.

Referring to FIG. 3, given that unknown information which can be expressed by a HMM chain is input, a predetermined number of reference information models which are previously prepared by training are stochastically searched using the Viterbi algorithm to find a reference information model that best matches the unknown information (steps 100 through 106). In particular, a minimum state probability ($\phi'_i(t)$) for a state searched at current time t in a HMM state lattice shown in FIG. 4 of an arbitrary reference information model among the plurality of reference information models is computed using the minimum state probabilities of effective states searched at previous time t−1, each of which is a probability accumulated along a search path up to previous time t−1. The computed minimum state probability ($\phi'_i(t)$) for the state searched at current time t which is greater than a minimum unlikelihood score (Min) is updated with a predetermined value (step 100). Hereinafter, any state searched at current time will be referred to as a particular state.

Given that the current time is t, the effective states refer to states searched at previous time t−1 from which transitions can be made to a particular state searched at current time t. If the current time is t+1, the effective states are states searched at time t from which transitions can be made to a particular state searched at current time t+1. Thus, any particular state searched at current time t may be either an effective state to be used in computing a minimum state probability of a state to be searched at next time t+1, or a non-effective state. Each of the effective states has a minimum state probability accumulated along a search path up to previous time t−1, which means that the minimum state probability of the effective state is not greater than a minimum unlikelihood score (Min). For the reference information model to be used first to find an optimal path, all the states existing in the lattice of the reference information model are regarded as effective states. The minimum unlikelihood score (Min) will be described later in greater detail. The minimum state probability of a particular state searched at current time t is the lowest among state probabilities of a transition to be made from the effective states searched at previous time t−1 to the particular state at current time t. Hereinafter, the minimum state probability of a particular state searched at current time t in the state lattice of FIG. 4 will be expressed as the symbol $\phi'_i(t)$, where i is a variable denoting the particular state and $1 \leq i \leq N$ (N is the number of information states constituting unknown information).

Figure 5:
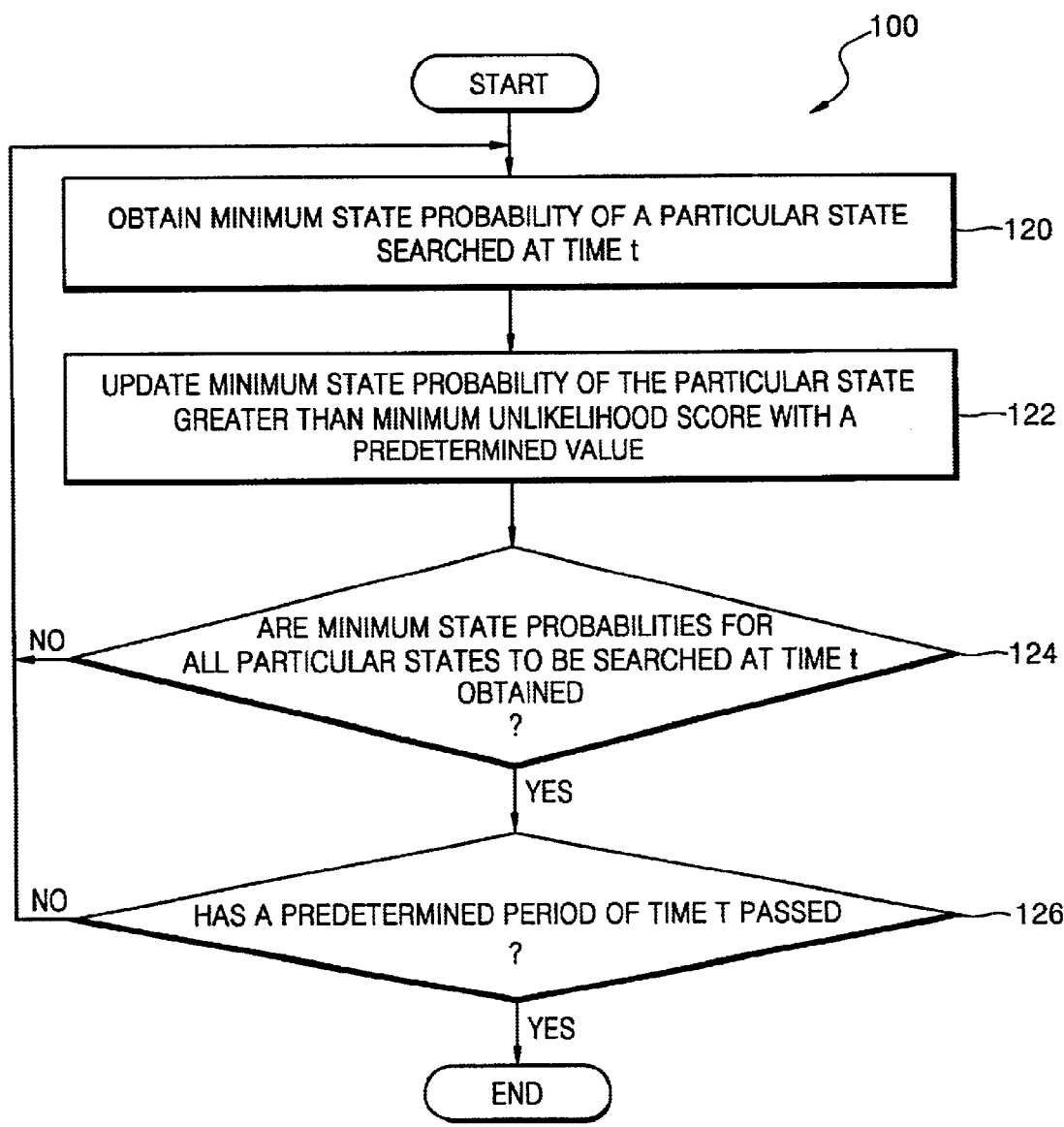
FIG. 5 is a flowchart illustrating step 100 of FIG. 3 in greater detail according to the present invention.

Detailed processes of step 100 of FIG. 3 according to the present invention will be described. FIG. 5 is a flowchart illustrating step 100 of FIG. 3 in greater detail according to the present invention. For each of the reference information models, during a period of time T, the minimum state probabilities of particular states searched at every time t in the state lattice of a corresponding reference information model are obtained, using the minimum state probabilities of the effective states searched at previous time t−1, each of which is a probability accumulated along a search path up to previous time t−1 (steps 120 through 126).

In step 120, the minimum state probability ($\phi'_i(t)$) of a particular state searched at current time t is obtained using the minimum state probabilities ($\phi'_{ij}(t-1)$) of the effective states searched at previous time t−1, each of which is a probability accumulated along a search path up to previous time t−1. In particular, as many state probabilities of a particular state as the effective states searched at previous time t−1 are obtained using the accumulated minimum state probabilities ($\phi'_{ij}(t-1)$), the probability of transition from the effective states to the particular state, and the state observation probability at the particular state. Next, the lowest among the computed state probabilities is determined as the minimum state probability $\phi'_i(t)$ of the particular state.

In step 122, the minimum state probability ($\phi'_i(t)$) of the particular state is updated with a predetermined value if the minimum state probability ($\phi'_i(t)$) is greater than the minimum unlikelihood score (Min). Here, if the minimum state probability ($\phi'_i(t)$) is not greater than the minimum unlikelihood score (Min), the minimum state probability ($\phi'_i(t)$) is maintained. Here, the predetermined value used for the updating must be greater than the minimum unlikelihood score (Min). Therefore, any particular state searched at current time t whose minimum state probability ($\phi'_i(t)$) is greater than the minimum unlikelihood score (Min) cannot become an effective state to be used for computing the minimum state probabilities of states to be searched at next time t+1.

In other words, if the minimum state probability of a state searched at a current time is updated with a predetermined value greater than the minimum unlikelihood score (Min), the state having the minimum state probability corresponding to the predetermined value cannot serve as an effective state for a state to be searched at a next time. The particular state searched at current time t which has a minimum state probability greater than the minimum unlikelihood score (Min) becomes not an effective state but a non-effective state for a state to be searched at next time t+1. In the information search method according to the present invention, the non-effective state at time t+1 is not used in computing the state probabilities of states searched at time t, so that a high-speed information search is possible with low-power consumption. Referring to FIG. 4, states 13, 14, 17, 18, 21, 22, and 23 are non-effective states which are not involved in computing the minimum state probabilities of the particular states.

After step 122, it is determined in step 124 whether or not the minimum state probabilities have been computed for all the particular states searched at current time t. If the minimum state probabilities of all the particular states searched at current time t have not been computed, steps 120 and 122 are iterated for a particular state searched at current time t for which the minimum state probability has not been computed yet. Meanwhile, if the minimum state probabilities have been computed for all the particular states searched at current time t, it is determined in step 126 whether or not a period of time (T) (here,T>t) has passed. If the period of time (T) has not passed, steps 120 through 124 are iterated for the states searched at a next time t+1. Meanwhile, if the period of time (T) has passed, the process goes to step 102 of FIG. 3.

Referring to FIG. 3, after step 100, the minimum unlikelihood score (Min) is updated with an optimal path value ($\phi'_{all—reference—sequence}$) if the minimum unlikelihood score (Min) is greater than the optimal path value ($\phi'_{all—reference—sequence}$) (step 102). For example, the minimum unlikelihood score (Min) is initially set to "∞". Next, a first reference information model stored in the dictionary is compared with input unknown information. After the comparison, the initial value (∞) of the minimum unlikelihood score (Min) is updated with an effective value, to be used in connection with a next reference information model. In particular, on an optimal path which is tracked on the state lattice of the first reference information model for a period of time T, the lowest among the minimum state probabilities of the particular states searched at a current time T is determined as an optimal path value A, and the minimum unlikelihood score (Min) is unconditionally updated with the optimal path value A. For the first reference information model, which is stored in the dictionary, the minimum state probabilities for all the states in the state lattice are computed for the period of time T.

Unlike the first reference information model, in tracking an optimal path in the state lattice of each of the other reference information models, which are also stored in the dictionary, when the minimum state probability computed for an arbitrary effective state is smaller than the minimum unlikelihood score (Min), the probability computed using the effective state is used as the minimum state probability ($\phi'_i(t)$). If an optimal path value B obtained from the optimal path for the second reference information model is smaller than the minimum unlikelihood score (Min=A), the initial unlikelihood score A is updated with the optimal path value B. Otherwise, the minimum unlikelihood score Min remains as the value A. This process is iterated for all the reference information modes which are stored in the dictionary, excluding the first reference information model.

For reference, the optimal path and the optimal path value are obtained as follows. All possible paths which can be made by effective states are traced in the state lattice of a reference information model for a period of time T. After the period of time T has passed, the lowest among the minimum state probabilities of the particular states searched at the current time T is determined as the optimal path value of the reference information model. The optimal path is formed by the effective states used to compute the optimal path value. For example, referring to FIG. 4, the path formed by linking effective states 1, 5, 10, 15, 19, and 24 is the optimal path, and the minimum state probability of the last state of the optimal path, i.e., state 24, is the optimal path value.

After step 102, it is determined in step 104 whether or not the optimal path values have been obtained for all reference information models. That is, as many as the optimal path values as there are reference information models are to be obtained. If the optimal path values for all reference information models are not all obtained, steps 100 and 102 are performed so as to obtain the optimal path value for the remaining reference information model. Meanwhile, if the optimal path values for all reference information models are obtained, the reference information model yielding the optimal path value with which the minimum unlikelihood score was last updated, as in step 102, is determined as the model that best matches the input unknown information (step 106). That is, when the optimal path values for all the reference information models are obtained, the minimum unlikelihood score (Min) updated in step 102 corresponds to the lowest optimal path value among the all the optimal path values. The minimum state probability determined as an optimal path value means the lowest probability that corresponding reference information model does not match input unknown information, i.e., the highest probability that the corresponding reference information model correctly matches the input unknown information. Thus, the reference information model having the lowest optimal path value corresponds to the model that best matches the input unknown information.

Figure 6:
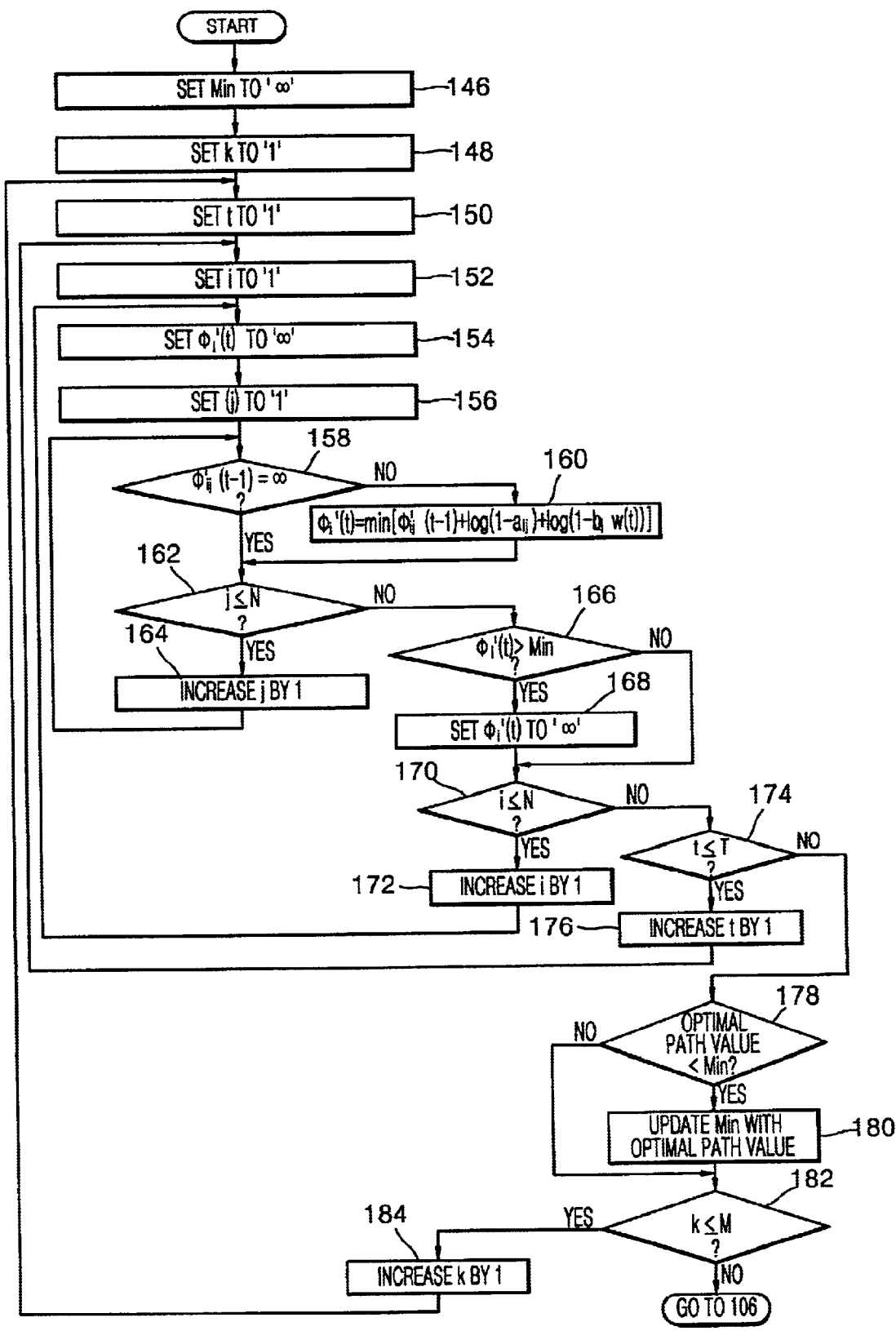
FIG. 6 is a flowchart illustrating a preferred embodiment of the information search method according to the present invention illustrated in FIGS. 3 and 5.

FIG. 6 is a flowchart illustrating a preferred embodiment of the information search method according to the present invention illustrated in FIGS. 3 and 5. The information search method involves steps 146 through 164 corresponding to step 120 of FIG. 5, steps 166 and 168 corresponding to step 122 of FIG. 5, steps 170 and 172 corresponding to step 124 of FIG. 5, steps 174 and 176 corresponding to step 126, steps 178 and 180 corresponding to step 102 of FIG. 3, and steps 182 and 184 corresponding to step 104 of FIG. 3.

Figures 1, 2:
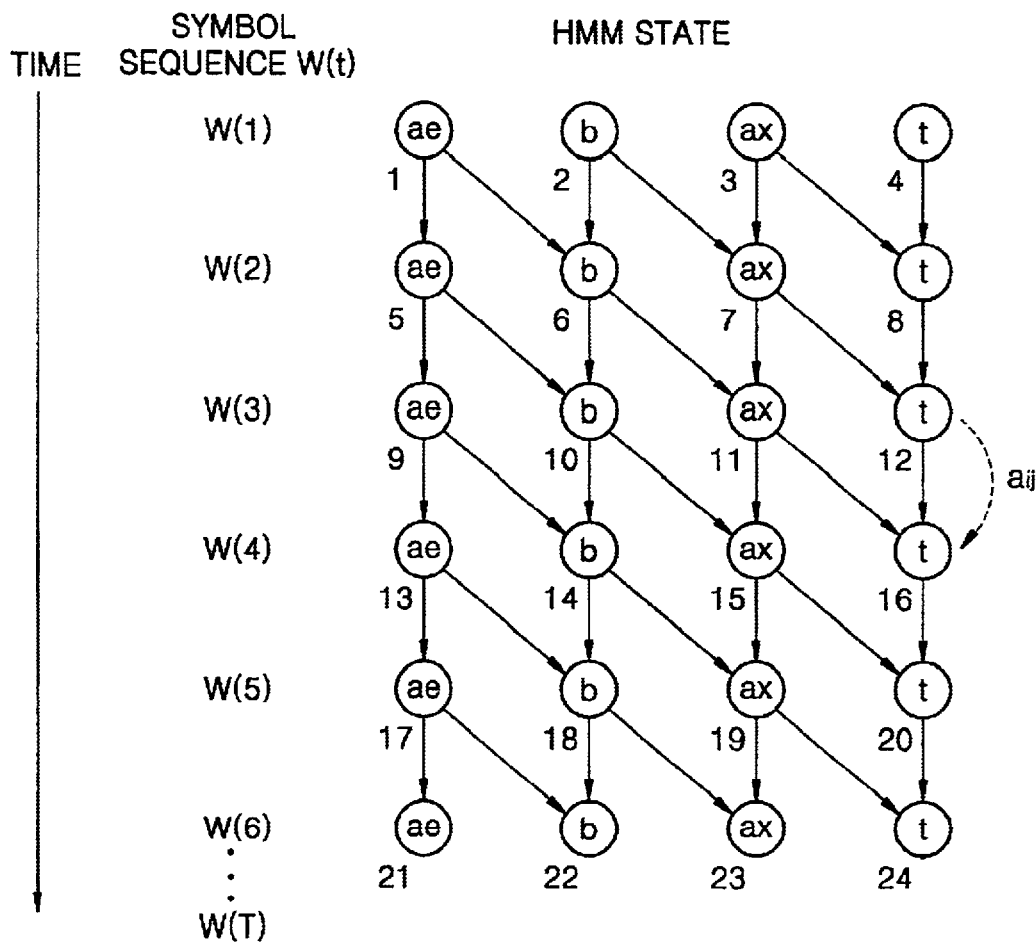
FIG. 1 is an exemplary state lattice of a conventional method illustrating a path along which an input speech utterance is recognized using a Hidden Markov model (HMM)
FIG. 2 shows a pseudo code for illustrating a conventional speech information search method.

To perform step 120, variables are initialized. That is, the minimum unlikelihood score (Min) is set to a predetermined value, for example, to infinity (∞) in step 146. The predetermined value is determined as infinity (∞) only for the first reference information model among a plurality of reference information models. After step 146, variable k, which indicates the address of a reference information model stored in a dictionary which is searched at current time, is set to 1, where 1≦k≦M, and M is the number of the reference information models to be used (step 148). After step 148, variable t is set to 1 (step 150). After step 150, variable i is set to 1 (step 152). After step 152, the minimum state probability ($\phi'_i(t)$) of the i-th particular state searched at current time t is set to a predetermined value, for example, infinity (∞) (step 154). After step 154, variable j is set to 1, which is an index denoting a state searched at previous time t−1 in the lateral direction of the state lattice of FIG. 4, and 1≦j≦N (step 156). After step 156, it is determined whether the minimum state probability ($\phi'_{ij}(t-1)$) accumulated along a path up to a previous time t−1 in case that the current time t is effective. To this end, in step 158, it is determined whether the previously accumulated minimum state probability ($\phi'_{ij}(t-1)$) is infinite. If the previously accumulated minimum state probability ($\phi'_{ij}(t-1)$) is not infinite, i.e., is effective, the minimum state probability ($\phi'_i(t)$) of a particular state searched at current time t is computed in step 160 by formula (1):

$$\phi'_i(t) = \min[\phi'_{ij}(t-1) + \log(1-a_{ij}) + \log(1-b_{ij}(W(t)))] \quad (1)$$

where $a_{ij}$ is transition probability, $b_{ij}W(t)$ is state observation probability, W(t) is a symbol sequence which indicates an utterance at time t, $b_{ij}$ indicates the probability for the symbol sequence W(t), and [ ] means the state probability.

In particular, in step 160, minimum state probabilities of the effective states searched at previous time t−1, each ($\phi'_{ij}(t-1)$) of which is a probability accumulated along a search path up to the previous time t−1, are substituted into equation (1) to compute as many state probabilities of the i-th particular state searched at current time t as there are effective states searched at the previous time t−1. The lowest state probability among the computed state probabilities is obtained as the minimum state probability ($\phi'_i(t)$) for the i-th particular state searched at current time t. Unlike the conventional speech search method illustrated with reference to FIG. 2, in which the maximum state probability ($\phi_i(t)$) of the state probabilities for a particular state is computed in step 7, in the information search method according to the present invention, as can be inferred from formula (1), the minimum state probability ($\phi'_i(t)$) among the state probabilities of a particular state is computed. The information search method according to the present invention determines whether a reference information model best matches input unknown information using the unlikelihood of the reference information model, rather than using the likelihood of the reference information model, and recognizes the unknown information using the determined result.

As shown in formula (1), when a decimal probability less than '1' is computed, the probability value is transformed into a logarithm. There are two advantages in taking logarithms of the probability value. The first advantage is that, when a probability is computed, the number of figures of the probability decreases with improved resolution. For example, given that a calculated probability is expressed in decimal form as $0.00000 \ldots 001(1\times10^{-31})$, the number of figures required to express the number is 32 including the decimal point. However, if the number is transformed into a logarithm, it can be expressed '−31' which needs just 3 figures, one of which is for the sign. The second advantage lies in that computations decrease because multiplications are transformed into additions. This will be described later with reference to an information search apparatus according to the present invention. In designing hardware, only addition operation, not multiplication operation, is applied, so that the amount of computation can be reduced, and power consumption also decreases.

In step 158, if it is determined that the state probability ($\phi'_{ij}(t-1)$) of a state searched at previous time t−1, which is a probability accumulated along a search path up to previous time t−1, is infinite ($\infty$), i.e., if the j-th state searched at previous time t−1 is not an effective state, computation of the state probability ($\phi'_{ij}(t)$) of the i-th state searched at time t using the accumulated state probability ($\phi'_{ij}(t-1)$) of the j-th state searched at previous time t−1 is not performed, and it is determined whether variable j is less than or equal to N (step 162). Step 162 is performed to determine whether another accumulated state probability ($\phi'_{i(j+1)}(t-1)$) next to the state probability ($\phi'_{ij}(t-1)$) accumulated along a path up to previous time t−1 is effective, and to compute another state probability ($\phi'_{i(j+1)}(t)$) of the i-th state searched at time t using another accumulated state probability ($\phi'_{i(j+1)}(t-1)$) if it is effective. In other words, if the state probability ($\phi'_{ij}(t-1)$) accumulated along a search path up to previous time t−1 is infinite ($\infty$), the accumulated state probability ($\phi'_{ij}(t-1)$) is not used in computing a state probability ($\phi'_i(t)$) of the i-th state searched at current time t. The reason for this is as follows. The minimum unlikelihood score (Min) is determined by the lowest among the minimum state probabilities of states searched at final time T when the optimal path for a reference information model is found. It is impossible for any minimum state probability ($\phi'_i(t)$) which is greater than the minimum unlikelihood score (Min) and is obtained in the middle of finding a new optimal path to become small in the future. Accordingly, to avoid unnecessary computations, non-effective states having infinite minimum state probabilities ($\phi'_{ij}(t-1)$) along the search path are not used.

For example, as shown in FIG. 4, the non-effective states 13, 14, 17, 18, 21, 22, and 23, which are stroked out, are removed from the search path, and the probabilities for finding an optimal path are computed without using the non-effective states. In FIG. 4, states 1, 5, 10, 15, 19, and 24, which are in black, form the optimal path along which an optimal path value, which can be used to update the minimum unlikelihood score (Min), is computed. When the minimum state probability of a particular state searched at current time t is computed, no state probabilities ($\phi'_{ij}(t-1)$) of the non-effective states searched at previous time t−1 which are infinite ($\infty$), as a probability accumulated along a corresponding path up to previous time t−1, are used, so that computation time and power consumption for an information search decrease. If j is less than or equal to N, j is increased by 1, and the process goes back to step 158 in step 164. Meanwhile, if j is greater than N, search for the i-th state at current time t is completed, and the process goes to step 166.

To perform step 122, it is determined in step 166 whether the minimum state probability ($\phi'_i(t)$) of the i-th state at current time t is greater than the minimum unlikelihood score (Min). If the minimum state probability ($\phi'_i(t)$) of the i-th state is not greater than the minimum unlikelihood score (Min), the process goes to step 170. Meanwhile, if the minimum state probability ($\phi'_i(t)$) of the i-th state is greater than the minimum unlikelihood score (Min), the minimum state probability ($\phi'_i(t)$) of the i-th state is set as infinity ($\infty$) in step 168.

To perform step 124, if the minimum state probability ($\phi'_i(t)$) of the i-th state is not greater than the minimum unlikelihood score (Min) in step 166, or after step 168, it is determined in step 170 whether i is less than or equal to N. If i is greater than N, the process goes to step 174. Meanwhile, if i is less than or equal to N, i is increased by 1 (step 172) and the process goes back to step 154. By doing so, the state probabilities are computed for all N states (i.e., i=1~N) searched at current time t.

To perform step 126, if i is greater than N in step 170, it is determined whether or not t is equal to or less than T (step 174). If t is greater than T, the process goes to step 178. Meanwhile, if t is equal to or less than T, t is increased by 1 (step 176) and the process goes back to step 152. By doing so, the minimum state probabilities for all N states are computed every time t for a period T.

To perform step 102, it is determined whether an optimal path value of the corresponding reference information model is smaller than the minimum unlikelihood score (Min) (step 178). If the optimal path value is not smaller than the minimum unlikelihood score (Min), the minimum unlikelihood score (Min) is maintained without being updated, and the process goes to step 182. Meanwhile, if the optimal path value is smaller than the minimum unlikelihood score (Min), the minimum unlikelihood score (Min) is updated with the optimal path value (step 180).

To perform step 104, if the optimal path value of the corresponding reference information model is not smaller than the minimum unlikelihood score (Min), or after step 180, it is determined whether or not k is less than or equal to M (step 182). If k is greater than M, the process goes to step 106. Meanwhile, if k is less than or equal to M, k is increased by 1 (step 184), and the process goes back to step 150. By doing so, the optimal path values for the remaining reference information models are computed, so that the minimum unlikelihood (Min) score can be updated with the lowest optimal path value among the computed optimal path values for all the reference information models.

As previously described, the information search method using the IHMM according to the present invention uses the minimum state probabilities of only effective states searched at previous time t−1, each of which is a probability accumulated along a search path up to previous time t−1, so as to obtain the minimum state probability of a particular state searched at current time t. The minimum state probabilities of the non-effective states searched at previous time t−1, each of which is a probability accumulated along a search path up to previous time t−1, are excluded in computing the minimum state probabilities of the particular state searched at current time t. Therefore, in the information search method according to the present invention, no unnecessary computations are performed, and therefore power consumption decreases.

The structure and operation of an information search apparatus using the IHMM according to the present invention, which performs the IHMM-based information search method according to the present invention, will be described.

Figure 7:
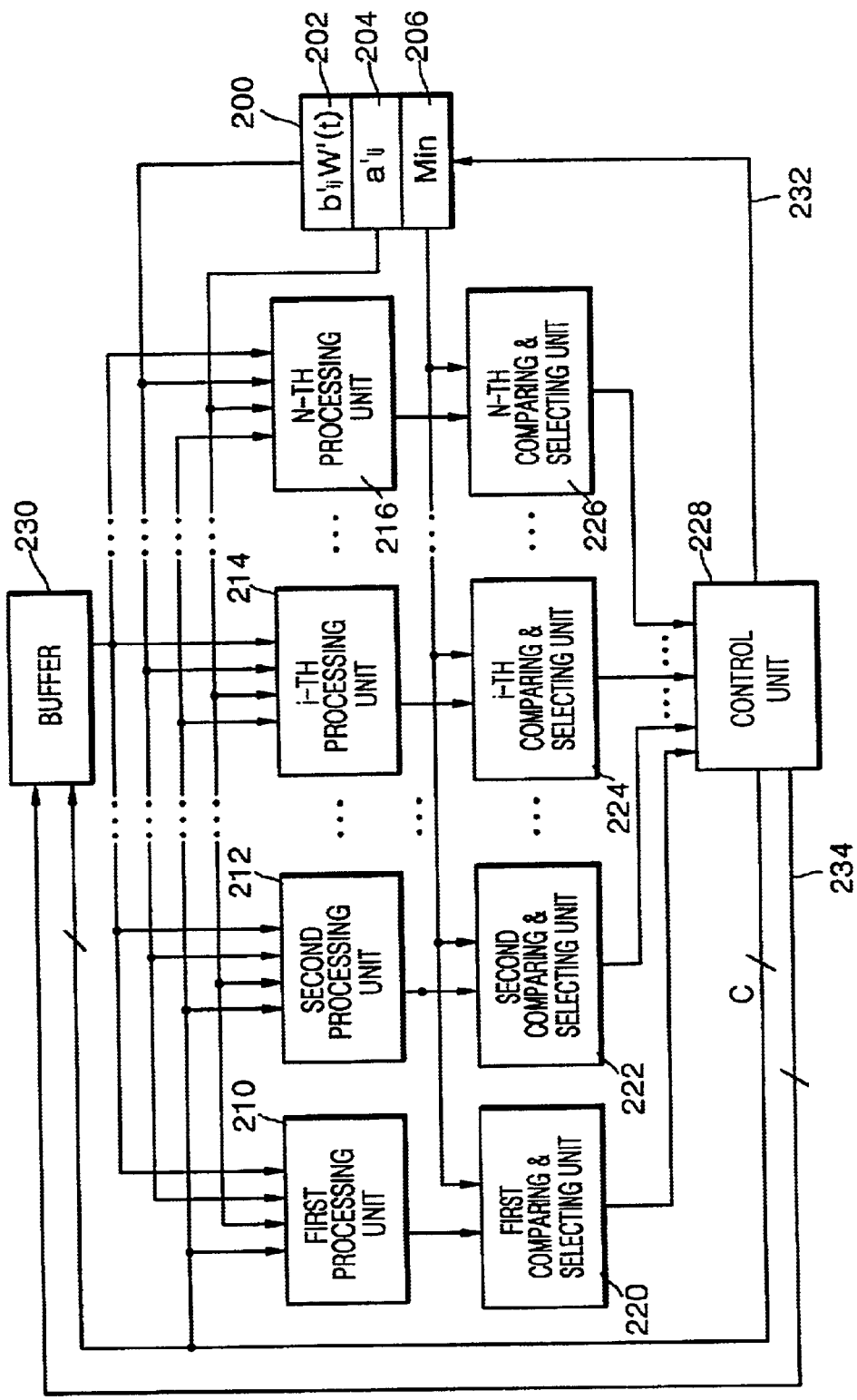
FIG. 7 is a block diagram of an information search apparatus using the IHMM used for the information search method of FIG. 5 or 6.

FIG. 7 is a block diagram of an information search apparatus using the IHMM according to the present invention which performs the information search method of FIG. 5 or 6. The information search apparatus includes a storage unit 200; a first processing unit 210, a second processing unit 212, . . . , an i-th processing unit 214, . . . , and an N-th processing unit 216; a first comparing & selecting unit 220, a second comparing & selecting unit 222, . . . an i-th comparing & selecting unit 224, . . . , and an N-th comparing & selecting unit 226; a control unit 228; and a buffer 230.

The storage unit 200 of FIG. 7 stores data, i.e., the minimum unlikelihood score (Min) 206, a first value ($a'_{ij}$) 204 associated with transition probability $a_{ij}$, and a second value ($b'_{ij}W(t)$) 202 associated with state observation probability $b_{ij}W(t)$. In response to a read control signal 232 output from the control unit 228, the storage unit 200 outputs the first value ($a'_{ij}$) 204 and the second value ($b'_{ij}W'(t)$) 202 among stored data, to the first processing unit 210, the second processing unit 212, . . . , the i-th processing unit 214, . . . , and the N-th processing unit 216, and outputs the minimum unlikelihood score (Min) 206 to the first comparing & selecting unit 220, the second comparing & selecting unit 222, . . . , the i-th comparing & selecting unit 224, . . . , and the N-th comparing & selecting unit 226. Here, the first value ($a'_{ij}$) 204 and the second value ($b'_{ij}W'(t)$) 202 stored in the storage unit 200 are obtained by taking logarithms of the transition probability $a_{ij}$ and the state observation probability $b_{ij}W(t)$ and converting the logarithms into positive values. Both the first value ($a'_{ij}$) 204 associated with transition probability $a_{ij}$, and the second value ($b'_{ij}W'(t)$) 202 associated with state observation probability $b_{ij}W(t)$ are positive values. The reason for changing the logarithms into positive values lies in that the logarithm of the probability expressed in decimals less than 1 is negative value. By converting the logarithms into positive values, a problem in designing hardware and other problems such as an overflow in computations, which would occur in computing negative values, can be avoided. The information search apparatus according to the present invention can perform computations without consideration of sign, by converting negative values into positive values.

The i-th processing unit 214, which is one of the processing units 210 through 216, processes a value output from the buffer 230, and the first value ($a'_{ij}$) 204 and the second value ($b'_{ij}W'(t)$) 202 output from the storage unit 200, selects the lowest result among the processed results in response to a control signal (C), and outputs the selected result to the i-th comparing & selecting unit 224 as the minimum state probability for the i-th particular state. For example, assuming that the i-th state is searched at current time t, the i-th processing unit 214 adds values ($\phi'_{i1}(t-1)$, $\phi'_{i2}(t-1)$, $\phi'_{i3}(t-1)$, . . . , $\phi'_{ij}(t-1)$, . . . , and $\phi'_{iN}(t-1)$) output from the buffer 230, the first value ($a'_{i1}$, $a'_{i2}$, $a'_{i3}$, . . . , and $a'_{iN}$) 204 output from the storage unit 200, and the second value ($b'_{i1}W'(t)$, $b'_{i2}W'(t)$, $b'_{i3}W'(t)$, . . . , and $b'_{iN}W'(t)$) 202 output from the storage unit 200, respectively. The i-th processing unit 214 compares the added results in response to the control signal C output from the control unit 228, selects the smallest added result, and outputs the selected result to the i-th comparing & selecting unit 224 as the minimum state probability ($\phi'_i(t)$) for the i-th particular state searched at current time t. Here, the number of processing units is equal to the number N of states searched at a given time. Each of the processing units shown in FIG. 7 performs step 120 of FIG. 5 or step 160 of FIG. 6. Steps 170 and 172 of FIG. 6 are accomplished by connecting N processing units in parallel, as shown in FIG. 7. In other words, each of the N processing units connected in parallel outputs the minimum state probability for each particular state searched at current time t, so that N minimum state probabilities for the N particular states are simultaneously output. Thus, there is no need for performing steps 170 and 172.

A preferred embodiment of the structure and operation of each of the processing units of FIG. 7, which computes the minimum state probability ($\phi'_i(t)$) for a particular state searched at current time t, will be described in greater detail with reference to FIG. 8. It is assumed that the current time t and the previous time is t−1.

Figure 8:
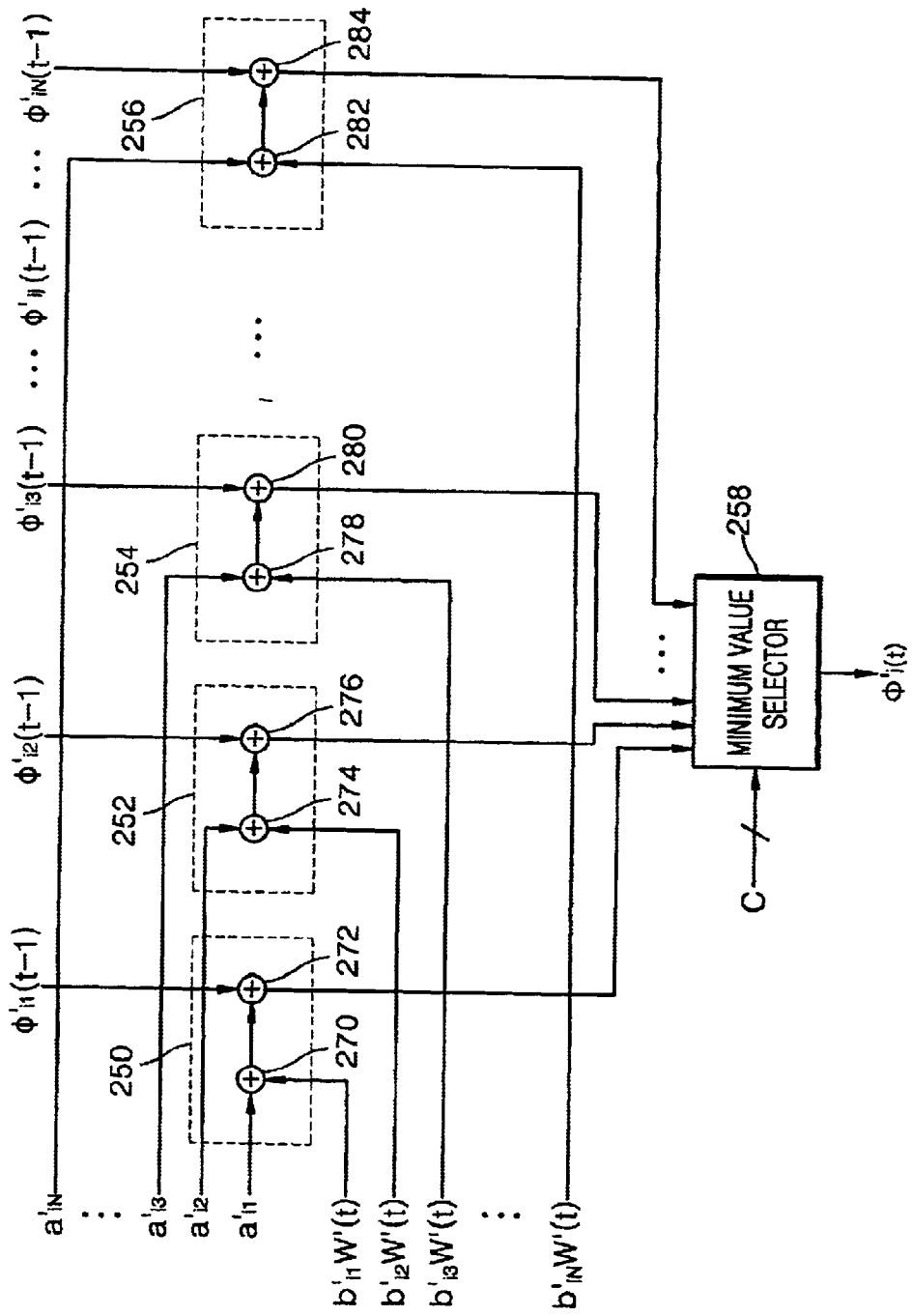
FIG. 8 is a block diagram of a preferred embodiment of the i-th processing unit of FIG. 7 according to the present invention.

FIG. 8 is a block diagram of the i-th processing unit 214 of FIG. 7 according to a preferred embodiment of the present invention. The i-th processing unit 214 includes a first adding portion 250, a second adding portion 252, a third adding portion 254, . . . , an N-th adding portion 256, and a minimum value selector 258. The first adding portion 250 includes two adders 270 and 272, the second adding portion 252 includes two adders 274 and 276, the third adding portion 254 includes two adders 278 and 280, and the N-th adding portion 256 includes two adders 282 and 284.

The i-th adding portion, which is one of the adding portions 250 through 256 shown in FIG. 8, adds the state probability ($\phi'_{ij}(t-1)$) accumulated up to previous time t−1 which is output from the buffer 230, and the first value ($a'_{ij}$) 204 and the second value ($b'_{ij}W'(t)$) 202, which are output from the storage unit 200, and outputs the added result to the minimum value selector 258. In particular, the first adder 270 of the first adding portion 250 adds a first value ($a'_{i1}$) and a second value ($b'_{i1}W'(t)$), and outputs the added result to the second adder 272. The second adder 272 adds the added result output from the first adder 270 and a first state probability ($\phi'_{i1}(t-1)$) accumulated up to previous time t−1, which is output from the buffer 230, and outputs the added result to the minimum value selector 258. Like the first adding unit 250, the adders of each of the second adding portion 252, the third adding portion 254, . . . , and the N-th adding portion 256 perform addition with three values, $\phi'_{ij}(t-1)$, $a'_{ij}$, and $b'_{ij}W'(t)$, as described with reference to FIG. 8.

The minimum value selector 258 compares the added results output from the first through N-th adding portions 250 through 256 in response to the control signal C output from the control unit 228, selects the smallest result among the added results output from the first through N-th adding portions 250 through 256, and outputs the selected smallest result to the corresponding i-th comparing & selecting unit 224 as the minimum state probability ($\phi'_i(t)$) of the i-th particular state searched at current time t. For example, if N=4, the minimum value selector 258 may be formed of first, second and third comparators (not shown). In this case, the first comparator selects the smallest value between the added results output from the second and fourth adders 272 and 276 by comparison, and the second comparator selects the smallest value between the added results output from the sixth and eighth adders 280 and 284 by comparison. The third comparator selects the smallest value between the selected values of the first and second comparators by comparison, and outputs the selected result as the minimum state probability ($\phi'_i(t)$) of the corresponding state.

Each of the processing units shown in FIG. 8 of the information search apparatus according to the present invention performs steps 160 through 164 of FIG. 6. Steps 162 and 164 of FIG. 6 are accomplished by connecting the first through N-th adding portions 250 through 256 in parallel, as shown in FIG. 8. For example, if N=4, the number of calculation stages per state is two in each processing unit shown in FIG. 8, and 8 adders and 3 comparators are needed for parallel calculations.

The i-th processing unit 214 of FIG. 8 receives the state probability ($\phi'_{ij}(t-1)$) accumulated up to previous time t−1, the first value ($a'_{ij}$), and the second value ($b'_{ij}W'(t)$), and outputs the minimum state probability ($\phi'_i(t)$) of the i-th particular state searched at current time t. The i-th processing unit 214 also receives the state probability ($\phi'_{ij}(t)$) accumulated up to time t, the first value ($a'_{ij}$), and the second value ($b'_{ij}W'(t+1)$), and outputs the minimum state probability ($\phi'_i(t+1)$) of the i-th state searched at next time t+1. As described above, the i-th processing unit 214 can be applied in computing the minimum state probability ($\phi'_i(t)$) of the i-th state searched at every time t for a period of time T.

The i-th comparing & selecting unit 224 compares the minimum state probability ($\phi'_i(t)$) output from the i-th processing unit 214 and the minimum unlikelihood score (Min) output from the storage unit 200, selects the minimum state probability ($\phi'_i(t)$) or a predetermined value, for example, infinity ($\infty$), in response to the result of the comparison, and outputs the selected value and a comparison flag having a level corresponding to the result of the comparison to the control unit 228. In other words, the i-th comparing & selecting unit 224 performs steps 166 and 168 of FIG. 6. For example, the first comparing & selecting unit 220 compares the minimum state probability ($\phi'_1(t)$) output from the first processing unit 210 and the minimum unlikelihood score (Min), and outputs the minimum state probability ($\phi'_1(t)$) or the predetermined value to the control unit 228 in response to the result of the comparison. In particular, the i-th comparing & selecting unit 224 determines whether or not the minimum state probability ($\phi'_i(t)$) output from the i-th processing element 214 is greater than the minimum unlikelihood score (Min) by comparison (step 166). If it is determined that the minimum state probability ($\phi'_i(t)$) is greater than the minimum unlikelihood score (Min), the i-th comparing & selecting unit 224 selects and outputs the predetermined value, e.g., infinity ($\infty$), to the control unit 228 (step 168). Meanwhile, if it is determined that the minimum state probability ($\phi'_i(t)$) is not greater than the minimum unlikelihood score (Min), the i-th comparing & selecting unit 224 selects and outputs the minimum state probability ($\phi'_i(t)$) of the i-th state to the control unit 228. Accordingly, step 168 is selectively performed by the i-th comparing and selecting unit 224.

To this end, the i-th comparing & selecting unit 224 may include a comparing unit (not shown) for comparing the minimum state probability ($\phi'_i(t)$) output from the i-th processing unit 214 and the minimum unlikelihood score (Min), and outputting the result of the comparison; and a selecting unit (not shown) for selectively outputting the minimum state probability ($\phi'_i(t)$) output from the i-th processing unit 214 or a predetermined value in response to the result of the comparison output from the comparing unit. The result of the comparison output from the comparing unit of the i-th comparing & selecting unit 224 may be output as the comparison flag.

The control unit 228 outputs a control signal C in response to the comparison flag output from each of the first through N-th comparing & selecting units 220 through 226. That is, the controller 228 performs step 158 of FIG. 6. For example, it is assumed that the comparing unit of the i-th comparing & selecting unit 224 outputs the result of the comparison to the control unit 228 as the comparison flag having a "high" level if the minimum state probability ($\phi'_i(t)$) is greater than the minimum unlikelihood score (Min), and as the comparison flag having a "low" level if the minimum state probability ($\phi'_i(t)$) is not greater than the minimum unlikelihood score (Min). In this case, if the comparison flag output from the i-th comparing & selecting unit 224 has a "high" level, the control unit 228 outputs a control signal C such that no comparison is performed at time t+1 by the minimum value selector 258 of the i-th processing unit 214 of FIG. 8. Meanwhile, if the comparison flag output from the i-th comparing & selecting unit 224 has a "low" level, the control unit 228 outputs the control signal C such that comparison is performed at time t+1 by the minimum value selector 258 of the i-th processing unit 214 of FIG. 8.

The control unit 228 also passes the output values 234 from the first through N-th comparing & selecting units 220 through 226 to the buffer 230. For example, the control unit 228 passes the minimum state probability ($\phi'_i(t)$) or a predetermined value output from the i-th comparing & selecting unit 224 to the buffer 230 without altering.

The buffer 230 receives and buffers the values 234 passed from the controller 228, and outputs the buffered values to the first through N-th processing units 210 through 216 in response to the control signal C output from the control unit 228. For example, when the i-th comparing & selecting unit 224 outputs the minimum state probability ($\phi'_i(t)$) of the i-th state searched at time t, the buffer 230 outputs the buffered minimum state probability ($\phi'_i(t)$) to the i-th processing unit 214 at next time t+1 in response to the control signal C output from the control unit 228.

Meanwhile, when the i-th comparing & selecting unit 224 outputs a predetermined value, the buffer 230 evenly outputs the minimum state probability ($\phi'_i(t-1)$), which was output to the i-th processing unit 214 at time t, to the i-th processing unit 214 at next time t+1 in response to the control signal C output from the control unit 228. When computing the minimum state probability ($\phi'_i(t+1)$) of the i-th state searched at next time t+1, the i-th processing unit 214 adds again the minimum state probability ($\phi'_i(t-1)$) output from the buffer 230, and the first and second values. Thus, the adding portions of the i-th processing unit 214 perform addition operation at time t+1 with the same values as used for time t. Actually, it provides an effect of performing no unnecessary addition operation at time t+1. As a result, power consumption and computation time for addition by the adding portions are saved.

When the i-th comparing & selecting unit 224 outputs a predetermined value, the information search apparatus according to the present invention, in response to a control signal C output from the control unit 228, does not operate the comparators of the minimum value selector 258 of the i-th processing unit, and provides the same effect as the adders of the adding portions do not operate. As a result, unnecessary comparison and additions are not performed, thereby reducing power consumption and computation time.

The information search method and apparatus using the IHMM according to the present invention can be applied for speech information recognition. Here, the speech information includes an isolated word and continuous speech. In this case, reference speech models are used as reference information models, a speech signal is input as external unknown information, and speech states serve as the information states described previously.

The probability used for a maximum likelihood score means the highest probability of a reference information model correctly matching given unknown information. Thus, the greater the similarity is, the higher the probability (likelihood score) is. However, the probability used for a minimum unlikelihood score, as described previously, means the lowest probability that a reference information model does not match given unknown information, i.e., the unlikelihood obtained by subtracting the likelihood probability from 1. As described previously, the information search method and apparatus using the IHMM according to the present invention uses the unlikelihood probability rather than the likelihood probability. Therefore, the lower a probability that a reference information model does not match given unknown information, the higher the likelihood that the reference information model would match the unknown information. Ultimately, both a conventional method which finds a best match reference information model having the maximum likelihood score using the likelihood probability, and the information search method according to the present invention which finds a best match reference information model having the minimum unlikelihood score using the unlikelihood probability are the same in recognizing unknown information. However, for the information search method according to the present invention, the amount and time of computations sharply decreases compared with the conventional method. This difference is evidenced as follows.

It is assumed that a speech information uttered "ABBAT" is recognized under the same conditions as applied in an article entitled "A Real-Time Isolated Word Recognition System" by Yun-Seok Cho and Hwang-Soo Lee in a bulletin entitled Intelligent Signal Processing And Communications Systems (ISPACS), 1994. Under this assumption, the information search method according to the present invention is compared with the conventional method using a simulation tool from Synopsys Inc. As a result, the information search method according to the present invention reduces computations by 68.57% with respect to the conventional method, which can be inferred from Table 1.

TABLE 1

| Number of States removed at time t | The amount of Computation |
| --- | --- |
| 0 | P + 4 × NC |
| 1 | P − (NA × 2 + NM × 1) × 4 + 4 × NC |
| 2 | P − (NA × 4 + NM × 2) × 4 + 4 × NC |
| 3 | P − (NA × 6 + NM × 3) × 4 + 4 × NC |
| 4 | −P |

In Table 1, P indicates the total amount of computation required by the conventional maximum likelihood based information search method using the Viterbi algorithm which needs 32 adders and 12 maximum value selectors. NC indicates the number of comparisons performed by the information search apparatus according to the present invention of FIG. 7, which corresponds to the number of comparing & selecting units 220 through 226, as shown in FIG. 7. NA indicates the number of addition operations performed by the information search apparatus according to the present invention, as shown in FIG. 8, which corresponds to the number of adders 270 through 284. NM indicates the number of comparators of the minimum value selector 258 shown in FIG. 8.

Comparing with the conventional speech information search method, for the information search method and apparatus according to the present invention, due to need for the comparing & selecting units 220 through 226, and the control unit 228, the number of gates required is 72.9% greater, as shown in Table 2.

TABLE 2

| Number of Gates for Processing Units | |
| --- | --- |
| Conventional Apparatus | Present Invention |
| 3516 gates | 6080 gates |

As described previously, the information search method and apparatus using the IHMM according to the present invention uses the minimum unlikelihood score instead of the maximum likelihood score in an HMM matrix. That is, because the minimum state probability of a particular state searched at current time t is computed using the minimum state probabilities of only the effective states searched at previous time t−1, each of which is a probability accumulated along the search path up to previous time t−1, the amount and time of computation for an information search can be reduced. As a result, an information search can be performed within a short period of time with reduced power consumption. Therefore, the cost of computing for searching, among other expenses required for information recognition, can be reduced, and an information search can be performed for an extended period of time with lower power consumption.

What is claimed is:

1. An information search method using an Inverse Hidden Markov Model (IHMM),for stochastically searching for a reference information model among a plurality of predetermined reference information models obtained by training that best matches unknown information which is expressed by a HMM chain, the information search method comprising the steps of:

(a) obtaining a minimum state probability $\phi'_i(t)$ for a particular state searched at a time t in a HMM state lattice of a reference information model by using minimum state probabilities of effective states, each of which is a probability accumulated along a search path up to a previous time t−1, and then updating the obtained minimum state probability $\phi'_i(t)$ with a predetermined value if the minimum state probability $\phi'_i(t)$ is greater than a minimum unlikelihood score;

(b) obtaining an optimal path value corresponding to the lowest of a plurality of minimum state probabilities obtained after step (a) is performed for a period of time T and updating the minimum unlikelihood score with the optimal path value if the minimum unlikelihood score is greater than the optimal path value;

(c) determining whether or not the optimal path value is obtained for each of the predetermined reference information models, and if not, iterating steps (a) and (b) for another reference information model for which the optimal path value has not been obtained; and (d) if the optimal path value has been obtained for each of the reference information models, determining that the reference information model yielding the optimal path value with which the minimum unlikelihood score was last updated best matches the unknown information, wherein during the period of time T, step (a) is performed for each of one or more states searched at each time t=1, 2, ... T, the effective states are states searched at previous time t−1 which have minimum state probabilities less than the minimum unlikelihood score, and from which a transition can be made to the particular state searched at time t, and the minimum state probability of the particular state corresponds to the lowest among state probabilities of the particular state for making a transition to the particular state from the effective states.

2. The information search method of claim 1, wherein the minimum state probability of the particular state corresponds to the lowest probability among the state probabilities obtained, equal in number to the effective states, by using the minimum state probabilities of the effective states, transition probabilities from the effective states to the particular state, and observation probabilities of the particular state, and the predetermined value is greater than the minimum unlikelihood score.

3. The information search method of claim 2, wherein step (a) comprises the steps of:

(a1) obtaining the minimum state probability $\phi'_i(t)$ for the particular state searched at time t;

(a2) updating the minimum state probability $\phi'_i(t)$ of the particular state with the predetermined value if the minimum state probability obtained in step (a1) is greater than the minimum unlikelihood score;

(a3) determining whether or not the minimum state probability $\phi'_i(t)$ has been obtained for each of the one or more states searched at time t, and if not, iterating steps (a1) and (a2) for each of the remaining states for which the minimum state probability $\phi'_i(t)$ has not been obtained; and (a4) determining whether or not the period of time T has passed if the minimum state probability $\phi'_i(t)$ has been obtained for each of the particular states, and if so, proceeding to step (b), and if not, performing steps (a1) through (a3) at a next time t+1.

4. The information search method of claim 3, wherein the minimum state probability $\phi'_i(t)$ of the particular state searched at time t is obtained by the following formula:

$$\phi'_i(t)=\min[\phi'_{ij}(t-1)+\log(1-a_{ij})+\log(1-b_{ij}(W(t)))]$$

where $a_{ij}$ is the transition probability; $b_{ij}W(t)$ is state observation probability for the particular state searched at time t; W(t) is a symbol sequence which indicates utterance at time t, $b_{ij}$ indicates the probability for the symbol sequence; $\phi'_{ij}(t-1)$ indicates the minimum state probability of the j-th state searched at time t−1 which is a probability accumulated along a search path up to previous time t−1; i is a variable indicating states searched at time t and $1 \leq i \leq N$; j is a variable indicating states searched at time t−1 and $1 \leq j \leq N$; N is the number of information states forming the unknown information; and [ ] means the state probability.

5. An information search apparatus using an Inverse Hidden Markov Model (IHMM), for performing the information search method according to claim 1, the information search apparatus comprising:

a storage unit for storing the minimum unlikelihood score, a first value related to the transition probability, and a second value related to the state observation probability;

first through N-th processing units;

first through N-th comparing & selecting units;

a control unit for outputting a control signal in response to a comparison flag output from each of the first through the N-th comparing & selecting units, controlling reading of data stored in the storage unit, and passing values output from the first through the N-th comparing & selecting units; and a buffer for receiving and buffering values passed by the control unit and outputting each of the buffered values to a corresponding processing unit among the first through the N-the processing units, in response to the control signal, wherein an i-th processing unit processes a value output from the buffer, and the first value and the second value provided from the storage unit, compares the processed results, selects and outputs the smallest processed result in response to the control signal, and an i-th comparing & selecting unit compares the smallest processed result output from the i-th processing unit with the minimum unlikelihood score provided from the storage unit, selects one of the predetermined value and the smallest processed result in response to the result of the comparison, and outputs the selected value and a comparison flag having a level corresponding to the result of the comparison to the control unit.

6. The information search apparatus of claim 5, wherein the i-th processing unit comprises:

first through N-th adding portions; and a minimum value selector, wherein an i-th adding portion adds a value output from the buffer, the first value, and the second value, and the minimum value selector selects the smallest added result among the added results output from the first through N-th adding portions, in response to the control signal, and outputs the selected smallest result as the smallest processed value to the i-th comparing & selecting unit.

7. An information search apparatus using an Inverse Hidden Markov Model (IHMM), for performing the information search method according to claim 2, the information search apparatus comprising:

a storage unit for storing the minimum unlikelihood score, a first value related to the transition probability, and a second value related to the state observation probability;

first through N-th processing units;

first through N-th comparing & selecting units;

a control unit for outputting a control signal in response to a comparison flag output from each of the first through the N-th comparing & selecting units, controlling reading of data stored in the storage unit, and passing values output from the first through the N-th comparing & selecting units; and a buffer for receiving and buffering values passed by the control unit and outputting each of the buffered values to a corresponding processing unit among the first through the N-the processing units, in response to the control signal, wherein an i-th processing unit processes a value output from the buffer, and the first value and the second value provided from the storage unit, compares the processed results, selects and outputs the smallest processed result in response to the control signal, and an i-th comparing & selecting unit compares the smallest processed result output from the i-th processing unit with the minimum unlikelihood score provided from the storage unit, selects one of the predetermined value and the smallest processed result in response to the result of the comparison, and outputs the selected value and a comparison flag having a level corresponding to the result of the comparison to the control unit.

8. The information search apparatus of claim 7, wherein the i-th processing unit comprises:

first through N-th adding portions; and a minimum value selector, wherein an i-th adding portion adds a value output from the buffer, the first value, and the second value, and the minimum value selector selects the smallest added result among the added results output from the first through N-th adding portions, in response to the control signal, and outputs the selected smallest result as the smallest processed value to the i-th comparing & selecting unit.

9. An information search apparatus using an Inverse Hidden Markov Model (IHMM), for performing the information search method according to claim 3, the information search apparatus comprising:

a storage unit for storing the minimum unlikelihood score, a first value related to the transition probability, and a second value related to the state observation probability;

first through N-th processing units;

first through N-th comparing & selecting units;

a control unit for outputting a control signal in response to a comparison flag output from each of the first through the N-th comparing & selecting units, controlling reading of data stored in the storage unit, and passing values output from the first through the N-th comparing & selecting units; and a buffer for receiving and buffering values passed by the control unit and outputting each of the buffered values to a corresponding processing unit among the first through the N-the processing units, in response to the control signal, wherein an i-th processing unit processes a value output from the buffer, and the first value and the second value provided from the storage unit, compares the processed results, selects and outputs the smallest processed result in response to the control signal, and an i-th comparing & selecting unit compares the smallest processed result output from the i-th processing unit with the minimum unlikelihood score provided from the storage unit, selects one of the predetermined value and the smallest processed result in response to the result of the comparison, and outputs the selected value and a comparison flag having a level corresponding to the result of the comparison to the control unit.

10. The information search apparatus of claim 9, wherein the i-th processing unit comprises:

first through N-th adding portions; and a minimum value selector, wherein an i-th adding portion adds a value output from the buffer, the first value, and the second value, and the minimum value selector selects the smallest added result among the added results output from the first through N-th adding portions, in response to the control signal, and outputs the selected smallest result as the smallest processed value to the i-th comparing & selecting unit.

11. An information search apparatus using an Inverse Hidden Markov Model (IHMM), for performing the information search method according to claim 4, the information search apparatus comprising:

a storage unit for storing the minimum unlikelihood score, a first value related to the transition probability, and a second value related to the state observation probability;

first through N-th processing units;

first through N-th comparing & selecting units;

a control unit for outputting a control signal in response to a comparison flag output from each of the first through the N-th comparing & selecting units, controlling reading of data stored in the storage unit, and passing values output from the first through the N-th comparing & selecting units; and a buffer for receiving and buffering values passed by the control unit and outputting each of the buffered values to a corresponding processing unit among the first through the N-the processing units, in response to the control signal, wherein an i-th processing unit processes a value output from the buffer, and the first value and the second value provided from the storage unit, compares the processed results, selects and outputs the smallest processed result in response to the control signal, and an i-th comparing & selecting unit compares the smallest processed result output from the i-th processing unit with the minimum unlikelihood score provided from the storage unit, selects one of the predetermined value and the smallest processed result in response to the result of the comparison, and outputs the selected value and a comparison flag having a level corresponding to the result of the comparison to the control unit.

12. The information search apparatus of claim 11, wherein the i-th processing unit comprises:

first through N-th adding portions; and a minimum value selector, wherein an i-th adding portion adds a value output from the buffer, the first value, and the second value, and the minimum value selector selects the smallest added result among the added results output from the first through N-th adding portions, in response to the control signal, and outputs the selected smallest result as the smallest processed value to the i-th comparing & selecting unit.

* * * * *